(12) United States Patent
Falk et al.

(10) Patent No.: US 8,799,652 B2
(45) Date of Patent: Aug. 5, 2014

(54) METHOD FOR ACTIVATING A NETWORK NODE

(75) Inventors: Rainer Falk, Erding (DE); Hans-Joachim Hof, Ingolstadt (DE)

(73) Assignee: Siemens Aktiengesellschaft, Munich (DE)

( * ) Notice: Subject to any disclaimer, the term of this patent is extended or adjusted under 35 U.S.C. 154(b) by 157 days.

(21) Appl. No.: 13/145,259

(22) PCT Filed: Dec. 2, 2009

(86) PCT No.: PCT/EP2009/066224
§ 371 (c)(1),
(2), (4) Date: Jul. 19, 2011

(87) PCT Pub. No.: WO2010/083914
PCT Pub. Date: Jul. 29, 2010

(65) Prior Publication Data
US 2012/0110331 A1   May 3, 2012

(30) Foreign Application Priority Data
Jan. 20, 2009 (DE) .......................... 10 2009 005 187

(51) Int. Cl.
*H04L 9/32* (2006.01)
*G06F 1/00* (2006.01)

(52) U.S. Cl.
USPC ............................ 713/168; 713/169; 713/172

(58) Field of Classification Search
USPC .......................................... 713/168, 172, 169
See application file for complete search history.

(56) References Cited

U.S. PATENT DOCUMENTS

| | | | | |
|---|---|---|---|---|
| 6,493,824 | B1 | 12/2002 | Novoa et al. | ............... H04L 9/10 |
| 7,310,670 | B1 * | 12/2007 | Walbeck et al. | ............... 709/225 |
| 2004/0230638 | A1 * | 11/2004 | Balachandran et al. | ...... 709/200 |
| 2005/0138377 | A1 * | 6/2005 | First et al. | ...................... 713/169 |
| 2006/0112287 | A1 | 5/2006 | Paljug | ....................... G06F 1/26 |

FOREIGN PATENT DOCUMENTS

| | | | | |
|---|---|---|---|---|
| JP | 2008283460 A | 11/2008 | ............... H04B 7/26 |
| WO | 00/33598 A1 | 6/2000 | ............... H04W 8/26 |
| WO | 2008/071762 A1 | 6/2008 | ............... H04L 12/56 |
| WO | 2010/083914 A1 | 7/2010 | ............ H04W 52/02 |

OTHER PUBLICATIONS

International Search Report and Written Opinion for Application No. PCT/EP2009/066224 (16 pages), Mar. 22, 2010.

* cited by examiner

*Primary Examiner* — Jeffrey Pwu
*Assistant Examiner* — Samuel Ambaye
(74) *Attorney, Agent, or Firm* — King & Spalding L.L.P.

(57) ABSTRACT

In a method for activating a destination network node (SN) to be woken up in a wireless network (1), in particular a sensor network, the destination network node (SN) is woken from a sleep operating mode if the destination network node verifies a received secret wake-up token (WUT) by a predefined test function and at least one stored wake-up token reference value (WUTRV). The method protects network nodes in a wireless network (1) from attacks which reduce the lifetime of the network nodes by preventing a sleep operating mode. The method is particularly suitable for sensor networks.

21 Claims, 10 Drawing Sheets

METHOD FOR ACTIVATING A NETWORK NODE

CROSS-REFERENCE TO RELATED APPLICATIONS

This application is a U.S. National Stage Application of International Application No. PCT/EP2009/066224 filed Dec. 2, 2009, which designates the United States of America, and claims priority to DE Application No. 10 2009 005 187.2 filed Jan. 20, 2009, the contents of which are hereby incorporated by reference in their entirety.

TECHNICAL FIELD

The invention relates to a method for activating a network node to be woken up in a wireless network.

BACKGROUND

Wireless networks are used in many fields of application, the nodes thereof communicating via a wireless radio interface. For example, wireless sensor networks or sensor-actuator networks are used for monitoring and controlling production plants, chemical processes or for monitoring pipelines. These sensor nodes and/or sensor-actuator nodes communicate wirelessly with one another via a radio interface in order to exchange measured values and control commands.

Such wireless networks generally comprise network nodes, the energy supply thereof being provided by a battery contained in the node. In such battery-operated network nodes, the lifetime and/or operating time thereof is restricted by the energy stored in the battery. As soon as the battery is empty, the circuits contained in the network node are not able to be supplied with power and no longer function. In order to increase the lifetime of a network node, therefore, the network node is under certain circumstances transferred to a sleep operating mode in which components and/or circuits within the network node are at least partially deactivated so that the energy consumption of the network node is reduced. In this connection, one of the circuit arrangements of the network node for a wireless network is formed by the radio interface and/or a transmission and receiving unit within the network node. As said transmission and receiving unit consumes a relatively large amount of energy, high energy savings and/or a significant increase in the lifetime may be achieved, if the transmission and receiving unit is transferred to a sleep operating mode and/or deactivated. A deactivation of the transmission and receiving unit, however, restricts the accessibility and/or the communication with the respective network node. Further components, such as for example a processing unit (microprocessor), may also be transferred into an energy-saving sleep state.

In order to permit the deactivation of the transmission and receiving unit and/or the radio module of a wireless network node and at the same time to ensure the accessibility and/or a wireless communication with the network node, therefore, a wireless network node is conventionally provided with an additional transmission and receiving unit and/or receiving component which is only provided to wake the respective network node from a sleep state and/or to transfer it from a sleep operating mode into a normal working operating mode. This additional transmission and receiving component is also referred to as the wake-up-radio and/or as the wake-up radio interface. In order to communicate with the network node, therefore, a transmitter which, for example, is located in a different network node, transmits a wake-up signal to the wake-up transmission and receiving component of the network node to be woken up, the received network node to be woken up being transferred and/or switched by the wake-up signal from the sleep operating mode into a normal working operating mode. As soon as the network node is in the normal working operating mode, the transmitter is able to communicate the desired message to the network node, which is received by the activated transmission and receiving device provided therefor and/or the radio module of the network node. The wake-up radio and/or the additional transmission and receiving component, which is provided for the wake-up signal, is designed such that it consumes considerably less energy than the usual main transmission and receiving unit for receiving messages.

This conventional method for activating a network node by means of a wake-up signal, however, provides the opportunity for the network node and/or the wireless network to be attacked by a third party. An attacker may namely exhaust the limited energy reserves of the battery-operated network nodes of the wireless network in a relatively short time, by waking up the network nodes continuously from the sleep operating mode by transmitting a wake-up signal and transferring them to the normal operating mode. Such an attack is also referred to as a sleep deprivation attack.

A method for the secure waking-up of a computer by a network card of the computer is disclosed in U.S. Pat. No. 6,493,824 B1, in which a data packet is received from a network, a destination address contained in the data packet is compared with a destination address of the network card and a wake-up pattern is sought within the data packet. If the destination addresses coincide and a wake-up pattern is found, an encrypted value of the data packet is decrypted and compared with an expected value. If the values coincide, a signal is generated for waking up the computer.

SUMMARY

According to various embodiments, a method for the secure activation of a network node to be woken up in a wireless network which protects from a sleep deprivation attack.

According to an embodiment, in a method for activating a destination network node to be woken up in a wireless network, the destination network node being woken up from a sleep operating mode if the destination network node verifies a received secret wake-up token by means of a predetermined test function and at least one stored wake-up token reference value.

According to a further embodiment, the secret wake-up token and the wake-up token reference value can be generated by the destination network node itself and, before the destination network node is changed into the sleep operating mode, being transmitted to a different network node of the network and stored there for subsequent activation of the destination network node. According to a further embodiment, the wake-up token and the wake-up token reference value can be generated by a different network node of the network, the wake-up token reference value, before the destination network node is changed into the sleep operating mode, being transmitted to the destination network node and being stored there for subsequent activation of the destination network node. According to a further embodiment, the wake-up token and the wake-up token reference value can be generated by a central security management node. According to a further embodiment, the generated wake-up token reference value can be transmitted from the central security management node to the destination network node and, before the destination network node is changed into the sleep operating mode, being stored in the destination network node. According to a further embodiment, the generated wake-up token can be provided by the central security management node to a network node for activating the destination network node. According to a further embodiment, the wake-up token reference value can be generated by the destination network node and the wake-up token being generated by a different network node of the wireless network based on a common secret key. According to a further embodiment, the wake-up token reference value and the wake-up token can be formed by means of a key derivation function from the key. According to a further embodiment, the key derivation function can be a hash function. According to a further embodiment, the wake-up token and the wake-up token reference value can be renewed after each activation process of the destination network node or after a predetermined number of activation processes of the destination network node or at predetermined time intervals. According to a further embodiment, the wake-up token and the stored wake-up token reference value can be formed by two adjacent members of a hash chain consisting of hash values. According to a further embodiment, the wake-up token and the wake-up token reference value can be derived from a character string. According to a further embodiment, the character string of the wake-up token can be assembled from one or more character sequences. According to a further embodiment, the assemblable character sequence may comprise: an identification code for identifying the network node which transmits the wake-up token to the destination network node for the activation thereof, a reason code which provides a reason for the activation of the destination network node, a conditional wake-up code which provides a condition for the activation of the destination network node, a node address of the destination network node or a predetermined wake-up code.

According to another embodiment, a network node for a wireless network may comprise an integrated wake-up circuit which transfers the network node from a sleep operating mode into a normal working operating mode if a received secret wake-up token is verified by means of a predetermined test function and at least one stored wake-up token reference value.

According to a further embodiment of the network node, the network node may have a memory for storing the wake-up token reference value. According to a further embodiment of the network node, the network node may be a sensor network node comprising at least one sensor. According to a further embodiment of the network node, the network node may be a portable telecommunication terminal. According to a further embodiment of the network node, the telecommunication terminal may be a mobile telephone, a laptop or a PDA.

According to yet another embodiment, a wireless network may comprise a plurality of network nodes as described above.

According to yet another embodiment, a computer program may comprise program commands for implementing the method as described above.

According to data carrier may store the computer program as described above.

BRIEF DESCRIPTION OF THE DRAWINGS

Moreover, embodiments of the method of the network node and of a wireless network are disclosed in detail with reference to the accompanying figures, in which.

DETAILED DESCRIPTION

According to various embodiments, in a method for activating a destination network node to be woken up in a wireless network, the destination network node being woken up from a sleep operating mode if the destination network node verifies a received secret wake-up token by means of a predetermined test function and at least one stored wake-up token reference value, the waking-up of the destination network node (SN) comprising an activation of a main radio module (2G) for transmitting and receiving messages.

In the method according to various embodiments, therefore, a secret wake-up token (WUT) is used for waking up the network node, instead of a known fixed wake-up signal, which is received by a wake-up radio module. The secret wake-up token (WUT) is, therefore, preferably only known to legitimate and/or authenticated transmission and receiving units.

In one embodiment of the method, the secret wake-up token and the wake-up token reference value are generated by the destination network node itself and, before the destination network node is changed into the sleep operating mode, are transmitted to a different network node of the network and, for example, stored there for subsequent activation of the destination network node.

In an alternative embodiment of the method, the wake-up token and the wake-up token reference value are generated by a different network node of the network, the wake-up token reference value, before the destination network node is changed into the sleep operating mode, being transmitted to the destination network node and stored there for subsequent activation of the destination network node.

In one possible embodiment of the method, the wake-up token and the wake-up token reference value are generated by a central security management node, a security management unit, a component or, for example, a server.

In this embodiment at least one management node and/or a security management node SM (security manager) is present inside or outside the wireless network. This embodiment simplifies the management and control of the generated wake-up token and wake-up token reference values for the different network nodes in the wireless network. The security management node SM may be a separate, autonomous node. Alternatively, security management functions may be implemented on a different node, for example, on a gateway node.

In one embodiment of the method, the generated wake-up token reference value is transmitted from the central security management node SM to the respective destination network node and, before the destination network node is switched to the sleep operating mode, is stored in the destination network node.

In this case, the generated wake-up token is preferably provided by the central security management node to a further network node for activating the destination network node.

In one embodiment of the method, the wake-up token reference value is generated by the destination network node and the wake-up token is generated by a different network node of the wireless network based on a common secret key.

In one embodiment of the method, therefore, the wake-up token reference value and the wake-up token are formed by means of a key derivation function from the respective key.

In one possible embodiment of the method, the key derivation function is a hash function.

In one possible embodiment of the method, the wake-up token and the wake-up token reference value are renewed after each activation process of the destination network node.

In a further embodiment of the method, the wake-up token and the wake-up token reference value are renewed after a predetermined number of activation processes of the destination network node.

In a further embodiment of the method, the wake-up token and the wake-up token reference value are renewed at predetermined time intervals.

In one possible embodiment of the method, the wake-up token and the stored wake-up token reference value are formed by two adjacent members of a hash chain consisting of hash values.

In one embodiment of the method, the wake-up token and the wake-up token reference value are derived from a character string. In this embodiment the character string of the wake-up token may be assembled from one or more character sequences.

In one possible embodiment of the method the assemblable character sequence comprises an identification code for identifying the network node which transmits the wake-up token to the network node for the activation thereof.

In one possible embodiment of the method, the assemblable character sequence comprises a reason code which provides a reason for the activation of the destination network node.

In one possible embodiment of the method, the assemblable character sequence has a conditional wake-up code which provides a condition for the activation of the destination network node, the destination network node being woken up if the condition is fulfilled. The condition is preferably tested by a component of the destination network node.

In one possible embodiment of the method, the assemblable character sequence comprises a node address of the destination network node.

In a further possible embodiment of the method, the assemblable character sequence comprises a predetermined wake-up code.

According to various embodiments, a network node for a wireless network can be provided comprising an integrated wake-up circuit which transfers the network node from a sleep operating mode into a normal working operating mode if a received secret wake-up token is verified by means of a predetermined test function and at least one stored wake-up token reference value, the transfer of the destination network node into the normal working operating mode (SN) comprising an activation of a main radio module (2G) for transmitting and receiving messages.

In one embodiment of the network node, the network node has a memory for storing the wake-up token reference value.

In one embodiment of the network node, the network node has a sensor network node comprising at least one sensor.

In a further embodiment of the network node, the network node is formed by a portable telecommunication terminal.

Said telecommunication terminal may be a mobile telephone, a laptop or a PDA.

According to various other embodiments, a wireless network can be created comprising a plurality of network nodes which in each case have an integrated wake-up circuit which transfers the associated network node from a sleep operating mode into a normal working operating mode if a received secret wake-up token is verified by means of a predetermined test function and at least one stored wake-up token reference value, the transfer of the destination network node into the normal working operating mode (SN) comprising an activation of a main radio module (2G) for transmitting and receiving messages.

According to various other embodiments, a computer program can be created comprising program commands for carrying out a method for activating a destination network node to be woken up in a wireless network, the destination network node being woken up from a sleep operating mode if the destination network node verifies a received secret wake-up token by means of a predetermined test function and at least one stored wake-up token reference value, the waking-up of the destination network node (SN) comprising an activation of a main radio module (2G) for transmitting and receiving messages.

According to yet further embodiments, a data carrier can be created which stores such a computer program.

Embodiments of the method for activating a network node inside a wireless network and a network node according to various embodiments are disclosed hereinafter with reference to the accompanying drawings.

Figure 1:
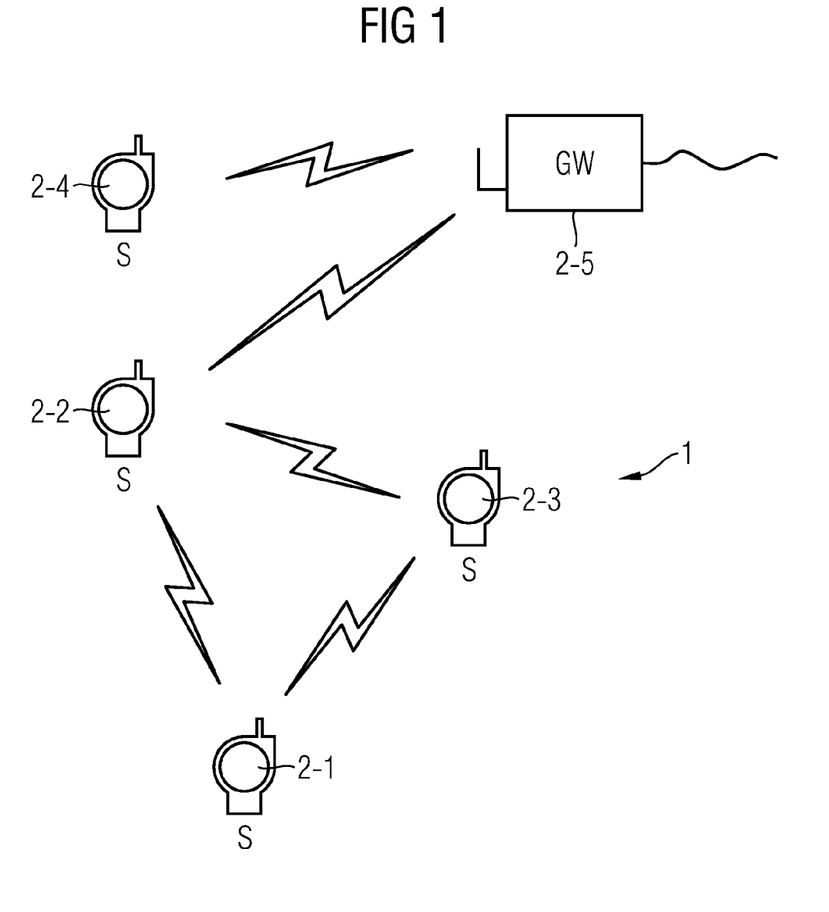
FIG. 1 shows a wireless network consisting of a sensor network node as an exemplary embodiment of a wireless network, in which the method is used for activating network nodes.

As can be seen from FIG. 1, in the exemplary embodiment shown a wireless network 1 consisting of a plurality of network nodes 2 is present, some of the nodes, i.e. the nodes 2-1 to 2-4 being sensor network nodes and the node 2-5 being a gateway node which connects the sensor network 1 to an infrastructure network, for example the Internet. The gateway node 2-5 may form a central security management node or may be connected to a separate security management node. In one variant, the security management node may be formed by a sensor network node S.

The network nodes 2 of the network 1 according to various embodiments may be mobile network nodes but also fixed network nodes.

The network nodes 2 of the network 1 communicate with one another via a wireless radio interface. The network nodes 2 are able to be switched between different operating modes. In one possible embodiment of the network according to various embodiments, the network nodes 2 have two operating modes, namely a sleep operating mode and a normal working operating mode. In the sleep operating mode, the respective network node 2 consumes little energy, so that, because of its potentially restricted battery supply, its lifetime and/or operating time is as long as possible. In normal working operating mode, the respective network node 2 is fully functional and may, for example, forward detected sensor data to the gateway node 2-5 and from there to a data processing unit.

Figure 2:
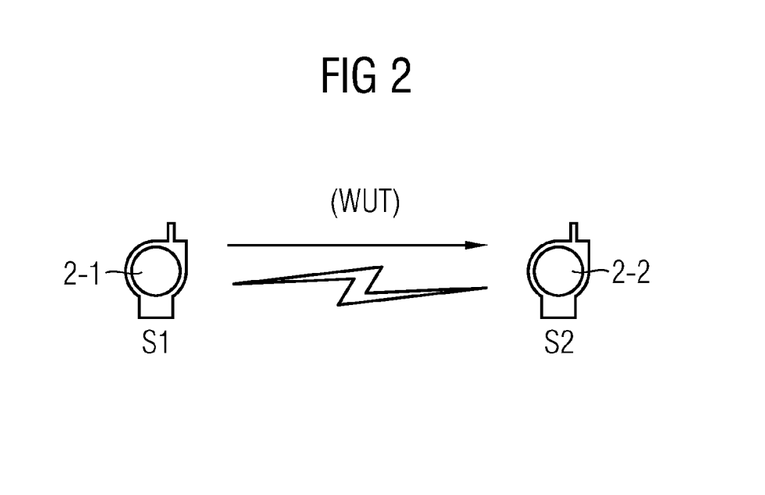
FIG. 2 shows a diagram for illustrating the communication between two sensor network nodes of the sensor network node network shown in FIG. 1, in which a network node is woken up by a different network node from a sleep operating mode.

FIG. 2 illustrates the waking-up of a network node in the wireless network 1 by a different network node. In the example shown, a network node 2-2 is woken up by a different network node 2-1, i.e. the network node 2-2 is transferred from a sleep operating mode into a normal operating mode. The network node 2-2 to be woken up by the network node 2-1 is referred to as the destination network node. As shown in FIG. 2, the network node 2-1 transmits a secret wake-up token WUT (Wake-Up-Token) to the destination network node 2-2. This received secret wake-up token WUT is verified within the received destination network node 2-2 by means of a predetermined test function and by means of at least one stored wake-up token reference value (WUTRV). The wake-up token WUT is only known to legitimate transmission and receiving nodes within the network 1. The received destination network node tests the wake-up token WUT by means of a wake-up token reference value WUTRV. If the wake-up token WUT is received by the destination network node 2-2 via its wake-up radio module from the other network node 2-1, the destination network node 2-2 is woken up from a sleep operating mode (deep sleep mode). Knowledge about a wake-up token WUT authorizes, therefore, a network node 2-i of the network 1 additionally to wake up and/or activate a different network node 2-j in the network 1.

When, due to any condition, a network node 2 in the network changes from its active normal operating mode into sleep operating mode, at the latest before the switching and/or change of operating mode to a different component and/or a different network node within the network 1, said network node provides one or more wake-up tokens WUT, test information and/or a wake-up token reference value WURTV being stored for verifying a received wake-up token WUT in a memory for the subsequent wake-up process.

Figure 3:
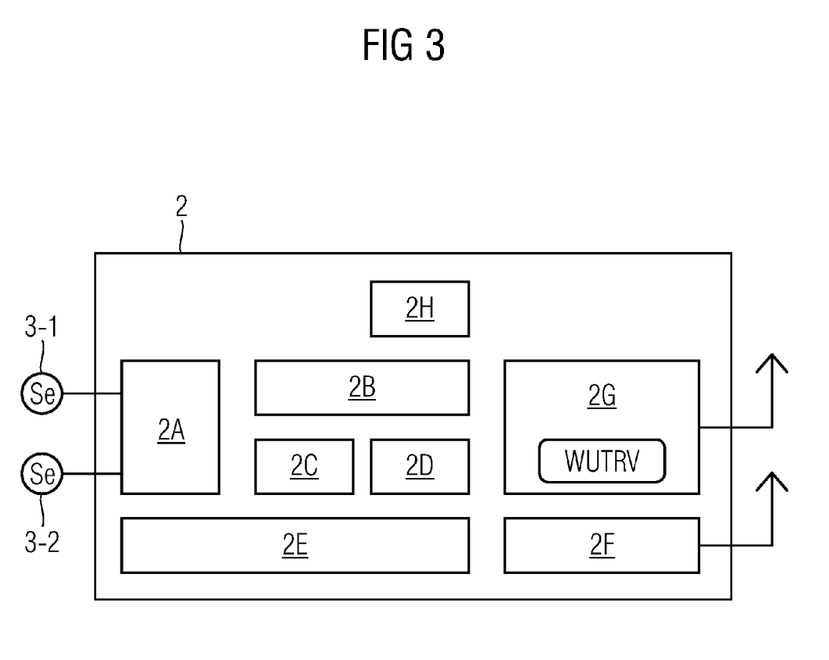
FIG. 3 shows a block diagram of a possible embodiment of a network node.

FIG. 3 shows a block diagram of an exemplary embodiment of a network node 2 in the wireless network 1. The exemplary embodiment shown in FIG. 3 is a sensor network node which is connected via an input/output unit 2A and/or via an interface to one or more sensors 3, 3-1, 3-2. The sensors 3-1, 3-2 may be contained within the sensor network node 2 and/or integrated therein, or be connected in a wireless and/or wired manner to the interface 2A. The sensors may, for example, be a temperature sensor, a moisture sensor or a brightness sensor. The network node 2, as shown in FIG. 3, has a data processing unit and/or CPU 2B, which in the embodiment shown has access to a flash data memory 2C and a RAM memory 2D. In the RAM memory 2D, for example, sensor data which are delivered by the sensors 3-1, 3-2, may be buffered. Moreover, the sensor network node 2 may have a signal processing unit 2E. As shown in FIG. 3, the network node 2 additionally has a transmission and receiving unit and/or a main radio module 2F and an integrated wake-up circuit 2G, which transfers and/or switches the network node 2 from a sleep operating mode into a normal working operating mode after receiving a secret wake-up token WUT which is verified by means of a predetermined test function and a stored wake-up token reference value WUTRV.

In one possible embodiment, the integrated wake-up circuit 2G has an internal memory and/or a data register in which the wake-up token reference value WUTRV is stored. The verification by means of the test function takes place via the integrated wake-up circuit 2G of the sensor network node 2. The functions of the normal working operating mode are generally implemented by the CPU 2B of the network node 2. In contrast to the CPU 2B and the transmission and receiving module and/or the main radio module 2F, the integrated wake-up circuit 2G of the network node 2 is characterized by low energy consumption. In one possible embodiment, the power is supplied to the network node 2 by a battery 2H provided therein. Many different variants of a network node 2 are possible. In the exemplary embodiment shown in FIG. 3 a sensor network node for a sensor network is present.

In one alternative embodiment, the network node 2 is also a portable telecommunication device, for example a mobile telephone, a laptop or a PDA.

It is also possible that the network node 2, in addition to sensors, as shown in FIG. 3, also has actuators which are controlled by the network node 2. A valve may be closed or opened, for example, by an actuator. The network node 2 is generally a mobile network node which is operated, for example, by a battery. It is, however, also possible for the network node 2 to be mounted or stored at a fixed location, and to be supplied with power in a different manner, for example by a solar cell or the like.

Figure 4:
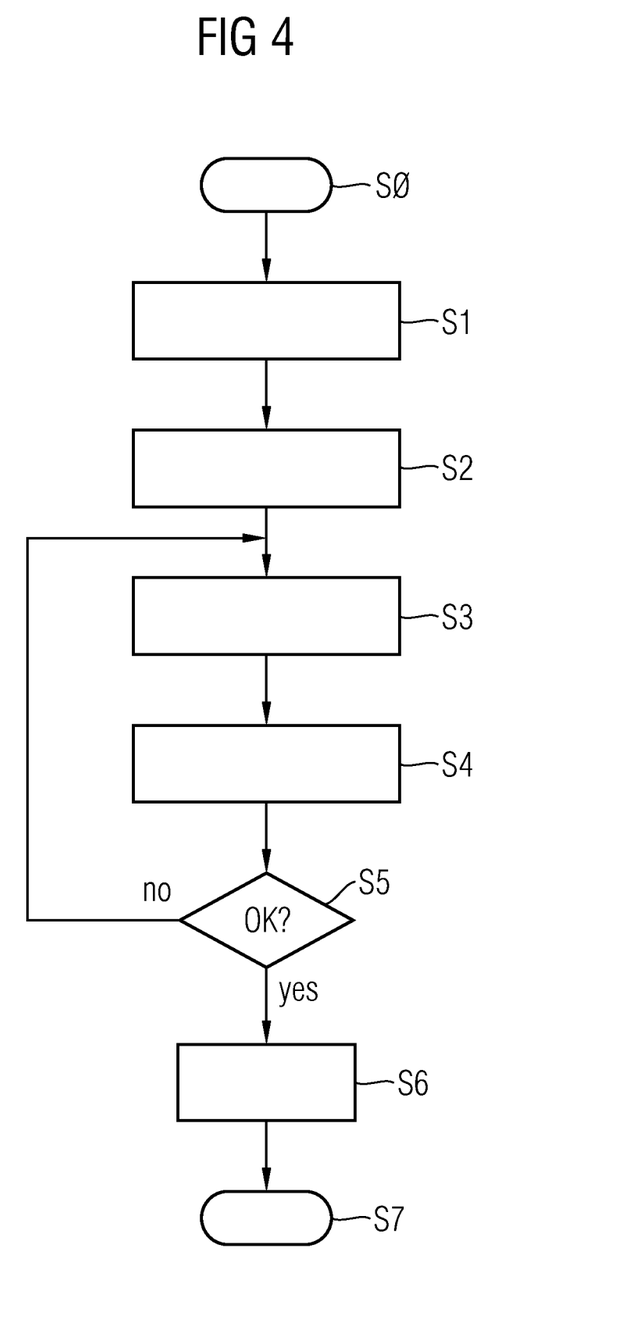
FIG. 4 shows a flow diagram for illustrating an exemplary embodiment of the method for activating a network node.

FIG. 4 shows a flow diagram for illustrating an exemplary embodiment of the method for activating a destination network node 2 to be woken up within a wireless network 1.

After an initial step S0, the network node 2 to be woken up initially receives in a step S1 a wake-up token reference value WUTRV generated by a different component and/or node, and stores this value in a step S2 in a data memory, for example in a data register of the wake-up circuit 2G shown in FIG. 3. After storing the wake-up token reference value WUTRV, in step S2, the network node 2 can switch to the energy-saving sleep operating mode.

As soon as the destination network node 2 in step S3 receives via the integrated wake-up circuit 2G a wake-up token WUT, said destination network node tests this received wake-up token WUT in step S4 by means of a predetermined test function and by means of the wake-up token reference value WUTRV stored in step S2. If, in step S5, the received wake-up token WUT is verified by the integrated wake-up circuit 2G, said wake-up circuit produces a wake-up signal in step S6 which wakes up the remaining components and/or circuits of the network nodes 2 from the sleep operating mode and/or transfers them from the sleep operating mode into a normal working operating mode. Thus, for example, by means of the wake-up signal generated in step S6, the CPU 2B shown in FIG. 3 and the main radio module 2F are activated for transmitting and receiving messages. After activation of the network node 2 the wake-up process shown in FIG. 4 terminates in step S7.

The verification of a received wake-up token WUT may take place as follows:
IF test function (WUTRV, WUT) returns TRUE THEN WAKE UP.

In one variant, the secret wake-up token WUT and the wake-up token reference value WUTRV are generated by the destination network node itself which is to be woken up. In this case, before switching to sleep operating mode, the network node may transmit the formed wake-up token to a different network node of the network 1 which stores the received wake-up token WUT for subsequent activation of the destination network node.

In one alternative embodiment of the method, the wake-up token WUT and the wake-up token reference value WUTRV are generated by a different network node of the network 1. In this variant, before the destination network node 2 is switched to sleep operating mode, the wake-up token reference value WUTRV is transmitted to this destination network node and stored there for subsequent activation of the destination network node, for example in a data register of the wake-up circuit 2G integrated therein.

In one variant, an associated wake-up token reference value WUTRV is generated for a wake-up token by a central secure management node, for example by a gateway node 2-5, as in the example shown in FIG. 1. The generated wake-up token reference value WUTRV is then transmitted from the central security management node 2-5 to the destination network node 2-*i* and, before changing the destination network node into the sleep operating mode, is stored in this destination network node 2-*i* for the subsequent wake-up process. The wake-up token generated by the central security management node 2-5 may then be provided to a different network node in the network 1 for activating the destination network node.

In this manner, a network node 2 which wishes to wake up the sleeping destination network node may directly request from the central security management node 2-5 the wake-up token WUT required therefor.

In one possible variant, the security management node 2-5 provides the required wake-up token WUT to the requesting node 2 only after a corresponding authorization check.

In one possible embodiment of the method, the wake-up token reference value WUTRV and the wake-up token WUT are generated separately by different network nodes 2 of the wireless network 1, based on a common secret key K. For example, the wake-up token reference value WUTRV may be generated by the destination network node to be woken up and the wake-up token WUT by a different network node, which might wake up the destination network node based on a common secret key K.

In one possible embodiment, therefore, the wake-up token reference value WUTRV and the wake-up token WUT may be formed by means of a key derivation function KDF (Key Derivation Function) from the key K.

WUT=KDF(K)

In one possible variant, the key derivation function KDF used is a hash function.

In one possible embodiment, a cryptographic key K is used which is otherwise present for a different purpose. For example, a key which is known network-wide, a so-called network key, may be used.

For example, a key hash function, such as for example HMAC-SHA1 which additionally uses a fixed character string as the input parameter, may be used as the key derivation function KDF.

In one possible embodiment of the method, the wake-up token WUT and wake-up token reference value WUTRV are derived from an assemblable character string. This assemblable character string may be assembled from one or more character sequences. These assemblable character sequences may encode different information.

In one possible embodiment, the assemblable character sequence has an identification code IC which serves to identify the network node 2 in the network 1, which transmits the wake-up token WUT to the destination network node for the activation thereof. In this manner, the wake-up token WUT contains information about the transmitting node. For receiving such a wake-up token WUT via the integrated wake-up circuit 2G of the network node 2 to be woken up, the network node 2 can establish immediately after waking up and/or after switching into normal operating mode the identity of the network node which has woken it up. In this manner, the woken-up network node 2 and/or the destination network node may, amongst other things, decide from which network node it subsequently accepts received messages. Moreover, the provision of an identification code IC to a certain extent permits a recall in which the woken-up network node 2 makes contact with the network node to be woken up.

In a further variant, the assemblable character sequence of the character string from which the wake-up token and the wake-up token reference value may be derived, has a so-called reason code RC which provides a reason for the activation of the destination network node 2. The reason code RC indicates why the network node 2 is to be woken up. Possible reasons for waking up a network node 2 may, for example, be the forwarding of data packets or alarm data packets or the required detection of sensor values or the implementation of configuration tasks. The reason code RC and the wake-up token WUT may be configured so that the integrated wake-up circuit 2G of the network node 2 to be woken up can already decide when receiving each individual bit whether the further part of the wake-up token WUT and/or the reason code RC for the receiving network node 2 to be woken up is relevant or may be ignored.

Based on the received reason code RC, therefore, the wake-up circuit and/or the wake-up radio component 2G of the received destination network node 2 can decide whether the network node 2 is woken up from the sleep operating mode or not. The information why the destination network node 2 is transferred from the sleep operating mode to the normal operating mode is available to the destination network node 2 immediately after waking up and may be taken into account for further processing of the data.

It is also possible that the woken-up destination network node 2 of the wake-up radio component and/or the integrated wake-up circuit 2G communicates, before its transfer to the sleep operating mode, that it is only to be woken up with the predetermined reason code RC. As a result, it is possible to adapt, amongst other things, the behavior of the destination network node 2 to the current energy status of the destination network node 2.

In a further embodiment of the method, an assemblable character sequence has a character string, on the basis of which the wake-up token WUT and the wake-up token reference value WUTRV may be formed, and a conditional wake up code.

The conditional wake-up code provides a condition for activating the destination network node 2. The conditional wake-up code may instruct, for example, the integrated wake-up circuit 2G of the destination network node 2 to permit a measurement to be carried out by a sensor 3 of the destination network node 2 and to transfer the destination network node 2 from the sleep operating mode into the normal operating mode only in the presence of and/or by fulfilling a specific condition. Such a condition may, for example, be that the measured value provided by the sensor 3 is above a predetermined threshold value. Such a measurement is possible with one or more sensors 3 without the participation of other components of the destination network node 2, so that the destination network node 2 may continue to remain in the sleep operating mode. This variant provides the advantage that, in the aforementioned process, the main unit and receiving unit and/or the main radio module 2F of the destination network node 2 does not have to be activated and thus the power consumption is minimal. Moreover, after waking up the destination network node 2 information is already available about the reason for waking up and sensor measured values so that immediate signal and data processing is possible.

In one embodiment, for example, a sensor value which is provided by a sensor 3-1, 3-2 is transferred via the I/O unit 2A directly to the wake-up circuit 2G. In one embodiment, the sensor value and/or a similar measuring signal is compared by means of a comparator with a reference and/or comparison value. This may take place both in an analog or digital manner. The CPU 2B may then be woken up depending on the comparator output signal and test at least one predetermined condition. If this condition is not fulfilled, the CPU 2B returns to sleep operating mode. If, however, the condition is fulfilled, by means of the CPU 2B the entire network node is activated, including the main radio module 2F.

In one variant, it is encoded into the wake-up code and/or the conditional wake-up code which conditions have to be tested. Alternatively, this information may be stored as belonging to a specific wake-up code.

Further variants of the method are possible. For example, the assemblable character sequence for a character string, based on which the wake-up token WUT and the wake-up token reference value WUTRV are derived, have a node address of the destination network node 2 or a wake-up code. Compared with a fixed wake-up code, this process provides improved protection against attacks as a wake-up code used once may not successfully be copied in again.

The use of reason codes RC and conditional wake-up codes makes it possible for a destination network node 2 only to process events and messages which are relevant thereto. This decision of the destination network node 2 is made whilst the destination network node 2 is still in energy-saving sleep operating mode, so that a considerably lengthened lifetime and/or operating time of the respective destination network node 2 may be achieved.

By the use of wake-up tokens WUT with or without reason codes or conditional wake-up codes, a destination network node 2 already has further information immediately after waking up, for example the identity of the network node to be woken up, the reason for waking up or a condition which has occurred of a sensor value. As a result, a more rapid processing of messages and a more rapid reaction to events is ensured. As a result, data processing within the network 1 is accelerated as a whole.

For increasing the security, in one variant of the method the wake-up token WUT and the wake-up token reference value WUTRV of a node 2 may be renewed.

In one variant, a renewal of the wake-up token WUT and of the associated wake-up token reference value WUTRV takes place in every activation process of the destination network node 2.

In a further variant, the renewal of the wake-up token WUT and the wake-up token reference value WUTRV takes place after a predetermined number of activation processes of the destination network node 2.

In a further variant, the renewal of the wake-up token WUT and the associated wake-up token reference value WUTRV takes place at predetermined time intervals i.e. periodically.

In one variant of the method, the wake-up token reference value WUTRV and the wake-up token WUT are formed by means of a key derivation function KDF from a secret cryptographic key K. In one variant, this key K may be a network key known to the network value.

In an alternative embodiment, the cryptographic key K is a key which is known only to a second network node in addition to the destination network node 2 to be woken up, i.e. in this variant there is a security relationship between these two network nodes.

In a further variant, only a predetermined group of network nodes is known to the cryptographic key K and forms a group key.

In an embodiment of the method, the key derivation function KDF is a hash function.

In one possible variant, the wake-up token WUT and the stored wake-up token reference value WUTRV are formed by two adjacent members of a hash chain consisting of hash values. Thus the wake-up token reference value WUTRV and the wake-up token WUT are taken from a hash chain which is known both to the transmission and receiving node. In this variant, for the next sleep phase of the destination network node 2 the wake-up token is determined using the next hash value in the hash table and/or hash chain. By this method, it is ensured that for each wake-up process a further wake-up token WUT is used which is only known to the transmission and receiving node.

If a wake-up token (old token) has already been used, it may potentially already be known to an attacker if it has been intercepted during the transmission. Such an attack may be prevented by the use of a further non-identical wake-up token. In this variant, a new wake-up token (new token) is different from the previously used wake-up token WUT (old token). A new wake-up token $WUT_i$ may be calculated from an already previously used token $WUT_{i-i}$ by means of an irreversible cryptographic hash function, such as for example MD5, SHA-1 or SHA-56.

$$WUT_i = H(WUT_{i-1})$$

An external third party and/or an attacker is thus not able to determine, by using acceptable computer processing capacity, a suitable new token $WUT_i$ even with knowledge of the previous token $WUT_{i-1}$.

In one possible variant, both the sensor node and the receiving node and/or the destination network node 2 are calculated from a known anchor value token (anchor token) by a series of hash values of a hash chain:

Token1=H(anchor token)
Token2=H(token 1) . . .
Token(n)=H(Token(n−1))

The token and/or hash values are then used backwards by the network nodes 2, starting with the token (n) followed by the token (n−1) and so on for verification.

One advantage of this variant is that in network nodes 2 which are frequently woken up, a new wake-up token WUT and/or a new wake-up token reference value WUTRV does not have to be set up every time and/or with each waking up process. For this variant, a wake-up token value and/or wake-up token reference value set up once, namely an anchor value (anchor token), may be used for n wake-up operations.

FIG. 5 to FIG. 11 show signal diagrams for illustrating different variants of the method for activating a destination network node 2.

Figure 5:
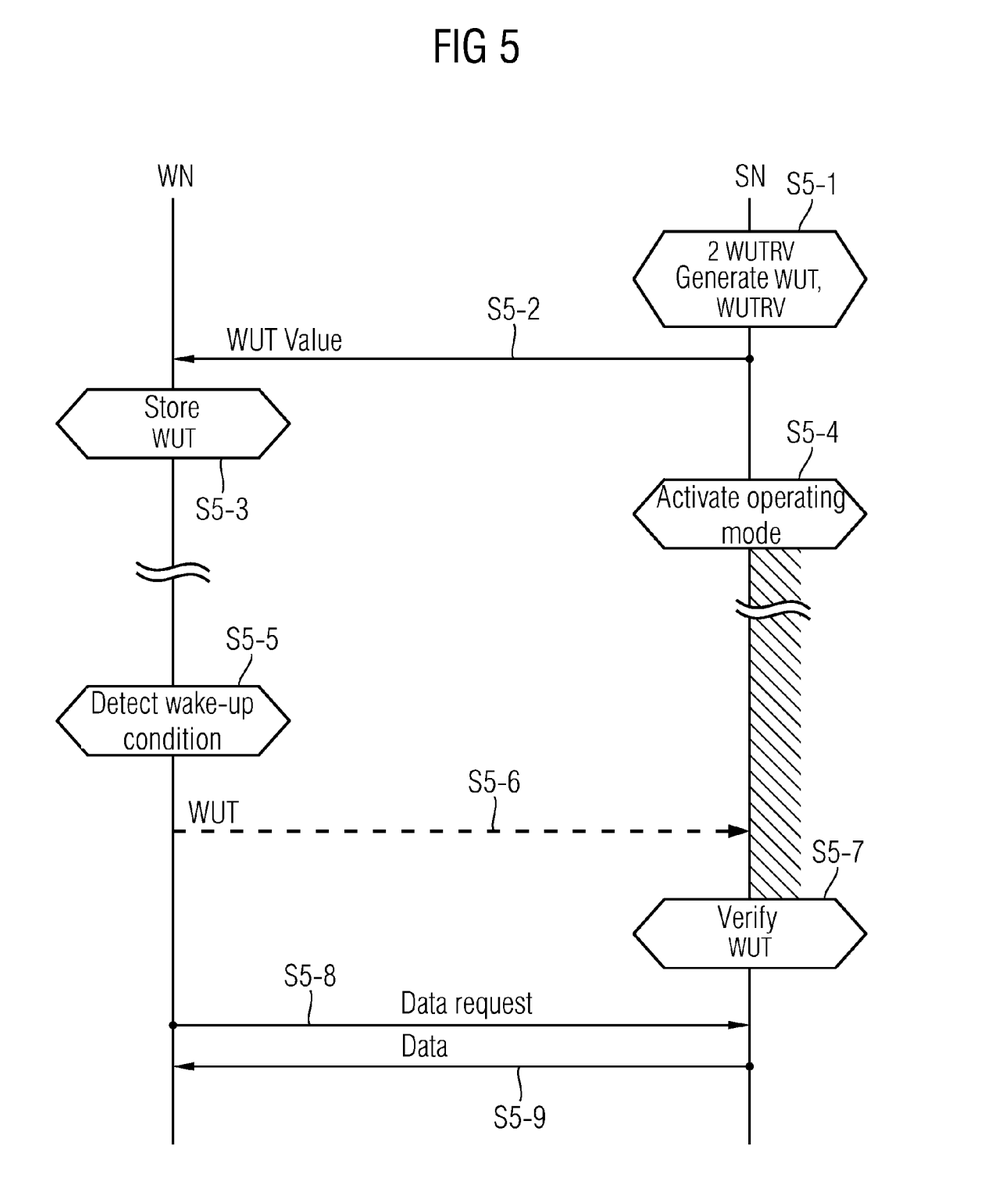
FIG. 5 shows a signal diagram for illustrating an exemplary embodiment of the method.

FIG. 5 shows a variant in which a wake-up token reference value (WUTRV) is formed by the destination network node SN itself which is to be woken up. In the view according to FIG. 5, SN denotes the destination network node (SN: sleep node) to be woken up and WN the node to be woken up (WN: wake-up node) which wakes up the destination network node SN to be woken up. The communication via the regular communication channel i.e. via the main radio module 2F shown in FIG. 3 is shown in the following FIGS. 5-11 as a single arrow, whereas a communication via the wake-up radio and/or via the integrated wake-up circuit 2G is shown as a thicker dashed arrow.

As shown in FIG. 5, the destination network node SN to be woken up initially produces (S5-1) the secret wake-up token WUT itself and an associated wake-up token reference value WUTRV, the wake-up token reference value WUTRV being able to be stored in a register of the integrated wake-up circuit 2G. Subsequently, the destination network node SN to be woken up transmits (S5-2) the secret wake-up token WUT for subsequent reawakening to a different network node 2 of the network 1, for example to the node WN shown in FIG. 5. This node WN is able to store the received wake-up token WUT in a memory (S5-3). In this connection, the received wake-up token WUT of the destination network node SN associated with a destination address of the destination network node SN is able to be stored.

As soon as the destination network node SN has transmitted the wake-up token WUT to at least one further network node within the network 1, it is able to change to sleep operating mode (S5-4) as shown in FIG. 5.

If the other network node WN detects the fulfilling of a wake-up condition for the destination network node SN (S5-5), it transmits (S5-6) the stored wake-up token WUT to the wake-up radio and/or the integrated wake-up circuit 2G of the destination network node SN. The integrated wake-up circuit 2G of the destination network node SN verifies the received wake-up token WUT (S5-7). Thus the received secret wake-up token WUT is verified by means of a predetermined test function and by means of at least one stored wake-up token reference value WUTRV. If, in the example shown in FIG. 5, the verification of the received wake-up token WUT is successful, the destination network node SN is transferred from the sleep operating mode into a normal working operating mode. In the example shown, the wake-up node WN which has woken up the destination network node SN requests, after a specific time, data (S5-8), for example sensor data. This is provided by the woken-up destination network node SN, for example a sensor network node (S5-9). For example, the destination network node SN transmits sensor data via the regular communication channel to the wake-up node WN.

Figure 6:
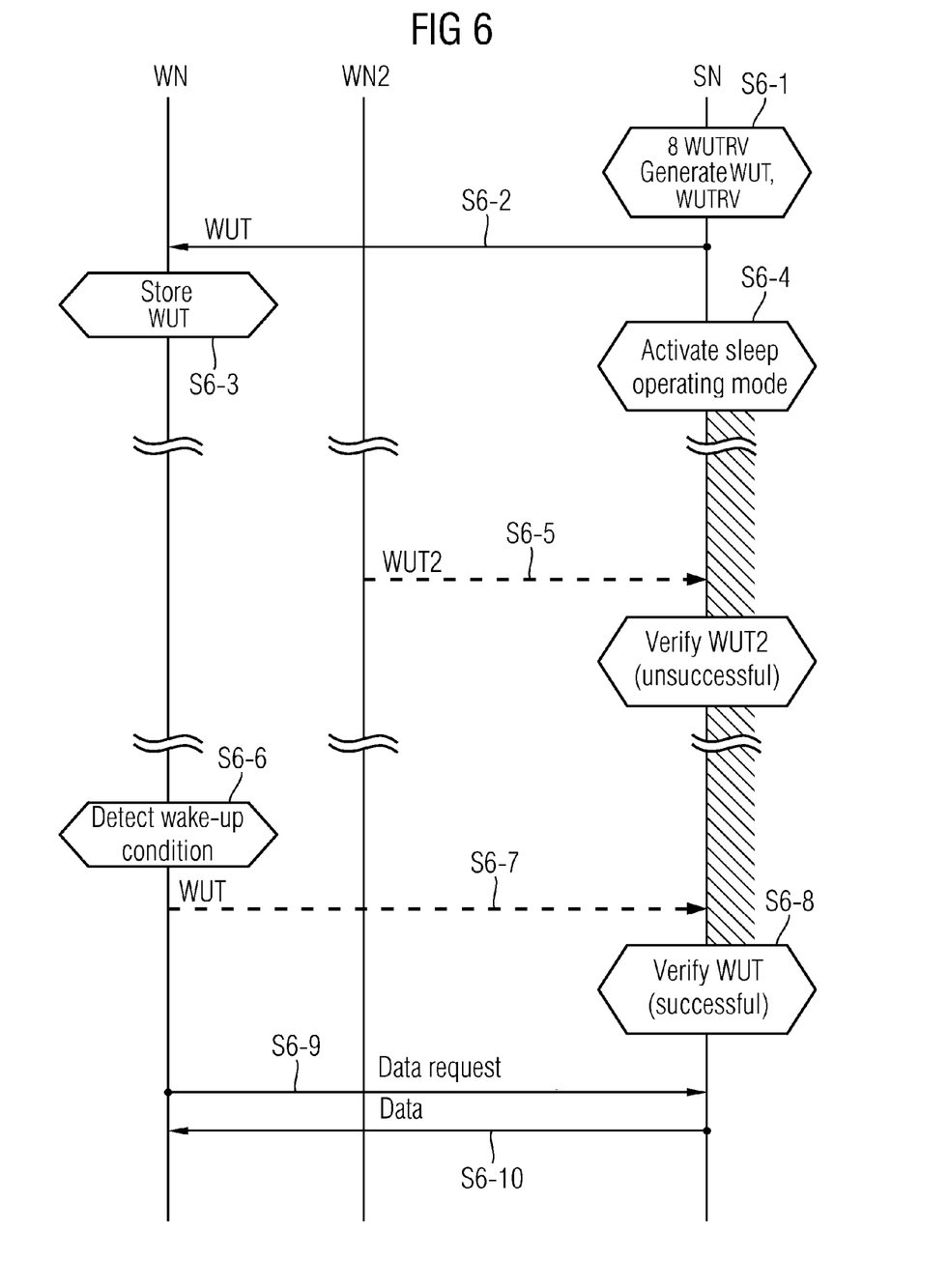
FIG. 6 shows a further signal diagram for illustrating an exemplary embodiment of the method.

FIG. 6 shows a variant in which initially a different network node WN2 transmits a different and/or incorrect wake-up token WUT2 (S6-5). In this case, the destination network node SN initially remains in the sleep operating mode. Only when the node WN which has the correct wake-up token WUT transmits this wake-up token to the destination network node SN (S6-7) is the destination network node SN, as shown in FIG. 6, woken up from the sleep operating mode (S6-8) and able to transfer (S6-10) the data to the node WN to be woken up, with the corresponding request (S6-9).

Figure 7:
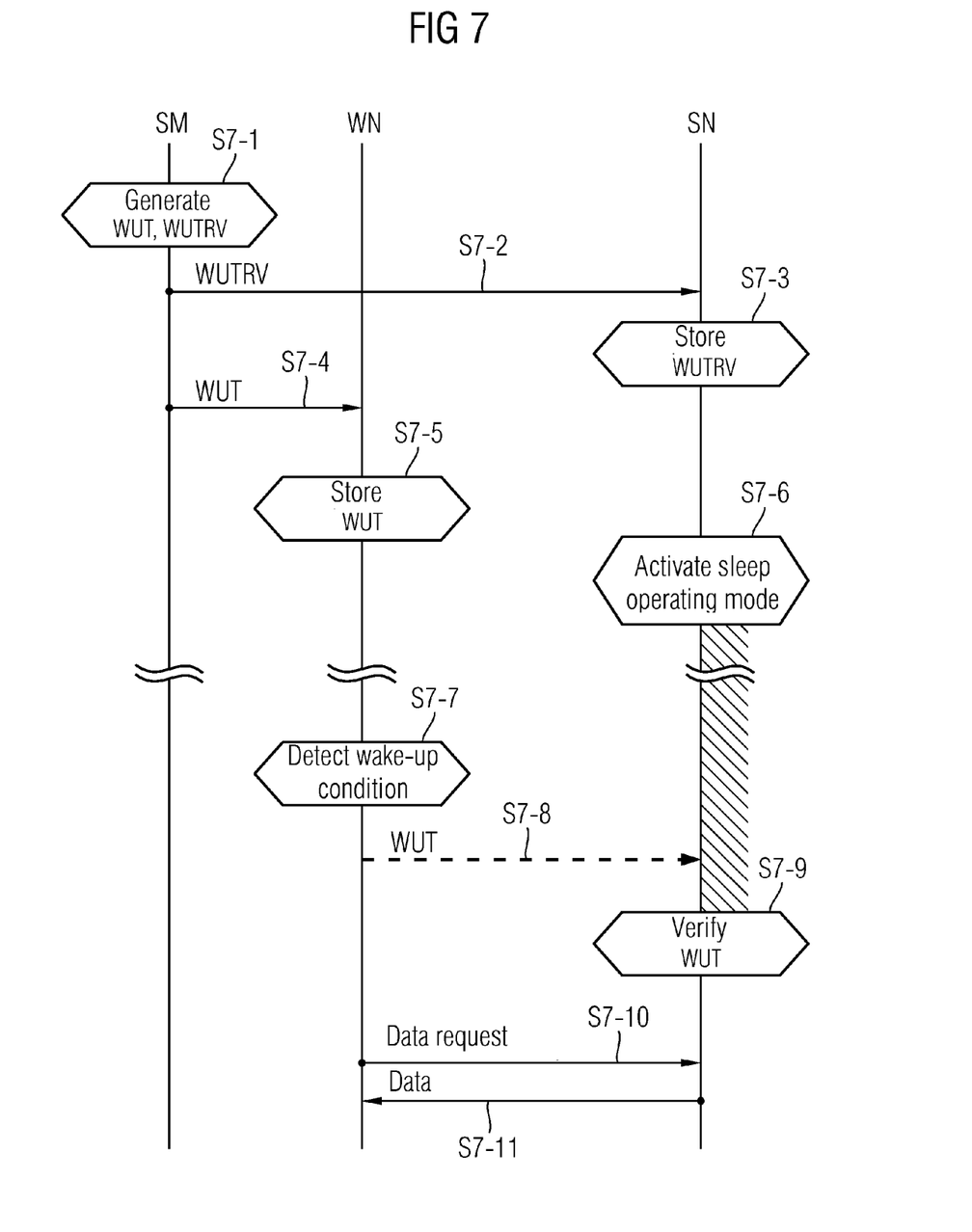
FIG. 7 shows a signal diagram for illustrating a further exemplary embodiment of the method.

FIG. 7 shows a variant in which the wake-up token reference value WUTRV is set up by a local security management node and/or a security management node SM. The security management node SM generates (S7-1) both the wake-up token WUT and the associated wake-up token reference value WUTRV, said security management node providing the wake-up token reference value WUTRV to the destination network node SN (S7-2) which stores said wake-up token reference value (S7-3) and supplies the associated wake-up token WUT to a different network node WN for storage (S7-1) which stores said wake-up token (S7-5). The destination network node SN changes (S7-6) into sleep operating mode. As soon as the network node WN detects the occurrence of a wake-up condition (S7-7), in the example shown it transmits (S7-8) the wake-up token WUT to the wake-up radio of the destination network node SN which verifies this as correct (S7-9). Subsequently, the transmission of data on request (S7-10) can take place (S7-11) from the destination network node SN to the node WN to be woken up.

Figure 8:
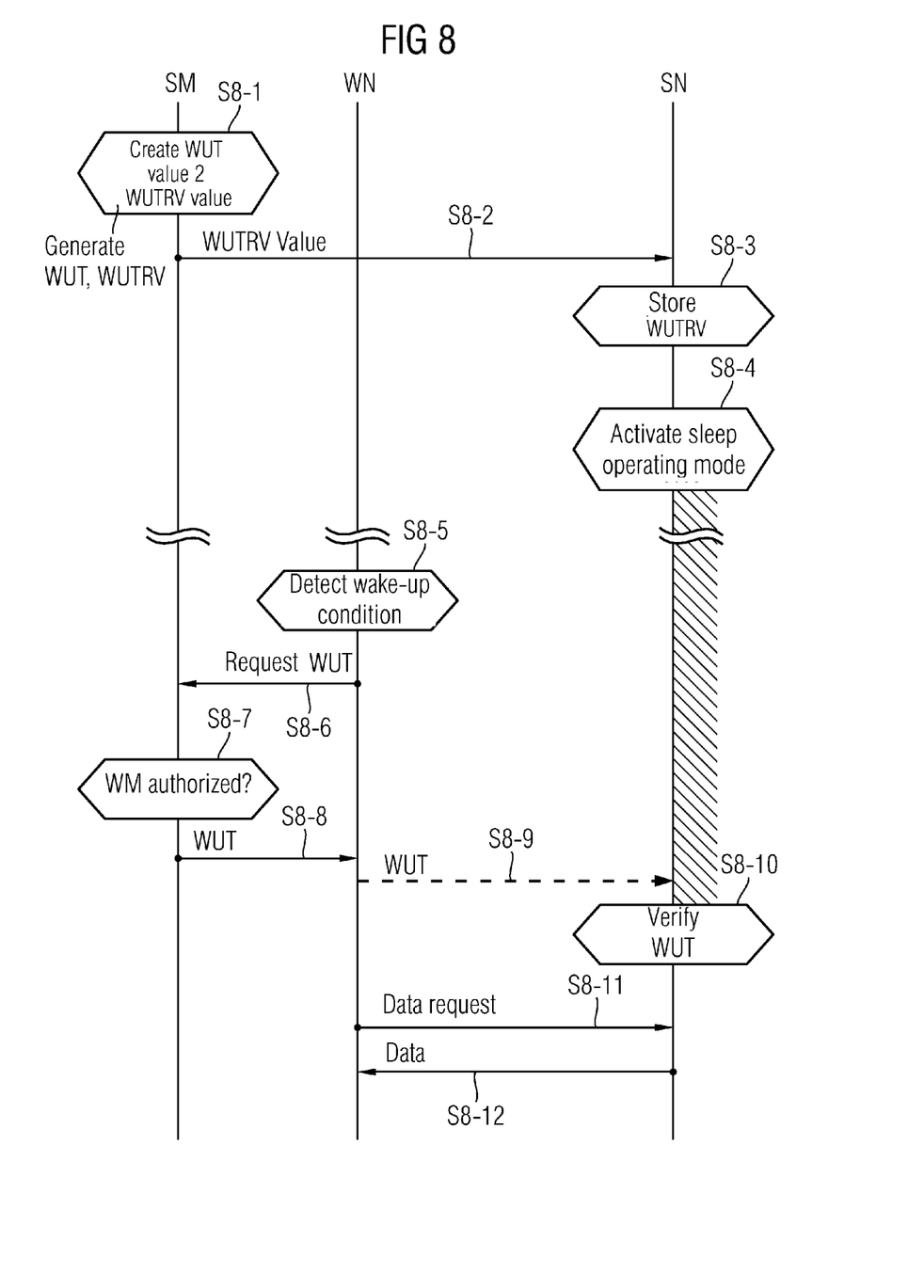
FIG. 8 shows a signal diagram for illustrating a further exemplary embodiment of the method.

FIG. 8 shows a further variant of the method in which the wake-up token reference value WUTRV is also set up by a security management node SM, with the wake-up token WUT being made available to this node WN by a network node WN of the network 1 only on request and/or if required however.

If, in the exemplary embodiment shown in FIG. 8, a network node WN establishes the occurrence of a wake-up condition for the destination network node SN (S8-5), it asks (S8-6) the security management node SM whether it can obtain a suitable wake-up token WUT for the destination network node SN. The security management node SM verifies (S8-7), in the exemplary embodiment shown in FIG. 8, whether the requesting network node WN is authorized to wake up the destination network node SN or not. In the example shown, the requesting network node WN is authorized to wake up the destination network node SN and obtains (S8-8) the wake-up token WUT required therefor.

The network node WN transmits (S8-9) this wake-up token WUT obtained to the integrated wake-up circuit 2G of the destination network node SN which verifies this wake-up token WUT (S8-10). In the example shown, the verification of the received wake-up token WUT is successful and the destination network node SN can provide the data (S8-12) requested by the node WN (S8-11).

Figure 9:
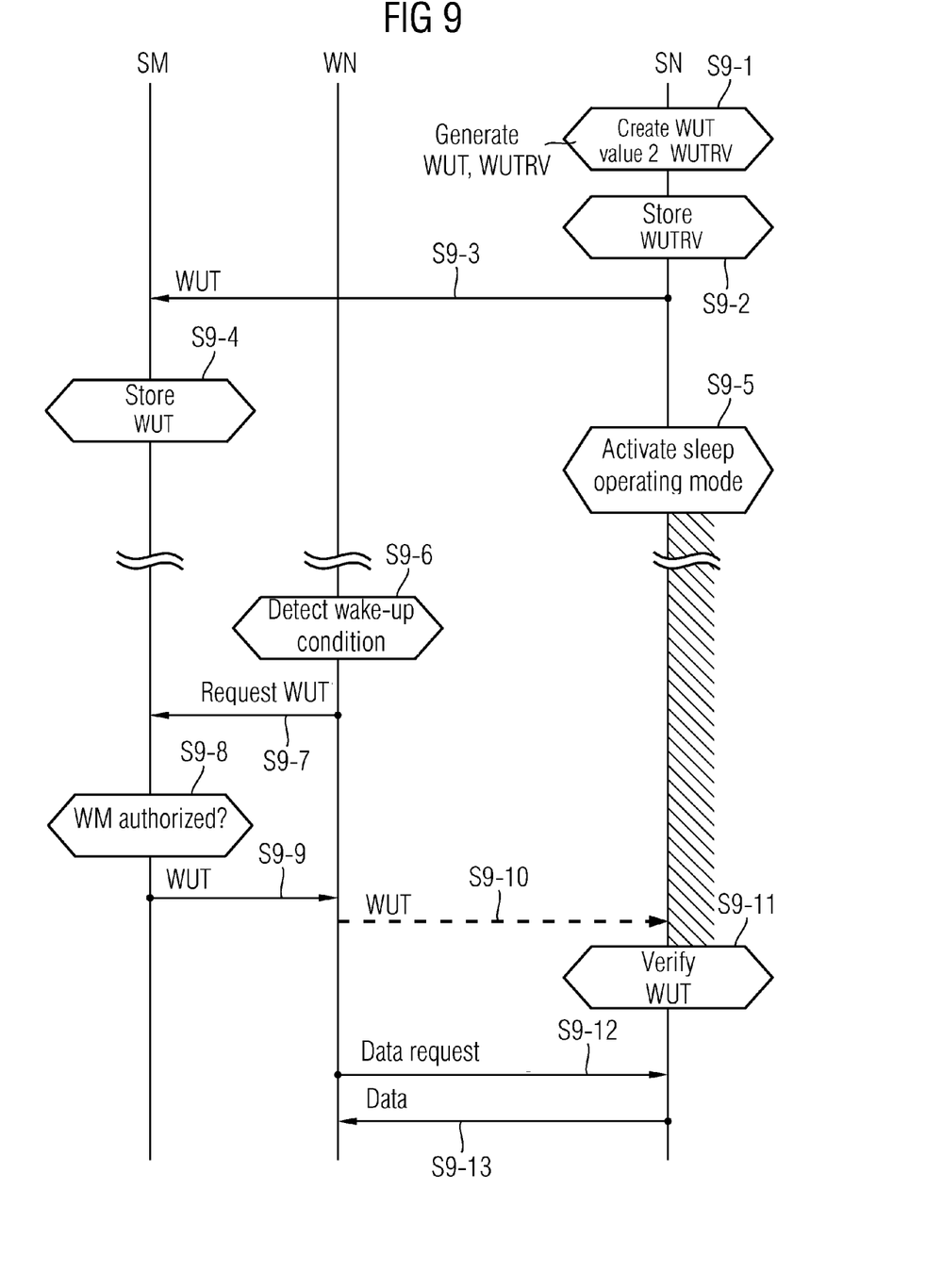
FIG. 9 shows a signal diagram for illustrating a further exemplary embodiment of the method.

FIG. 9 shows a further variant in which a wake-up token WUT generated by the destination network node SN is registered with a central security management node SM. If a network node WN, after the detection (S9-6) of a wake-up condition for a destination network node SN, requires a suitable wake-up token WUT, it obtains (S9-9) on request (S9-7) the wake-up token WUT registered with the security node SM, provided the requesting network node WN after verification (S9-8) is authorized to wake up the destination network node SN.

Figure 10:
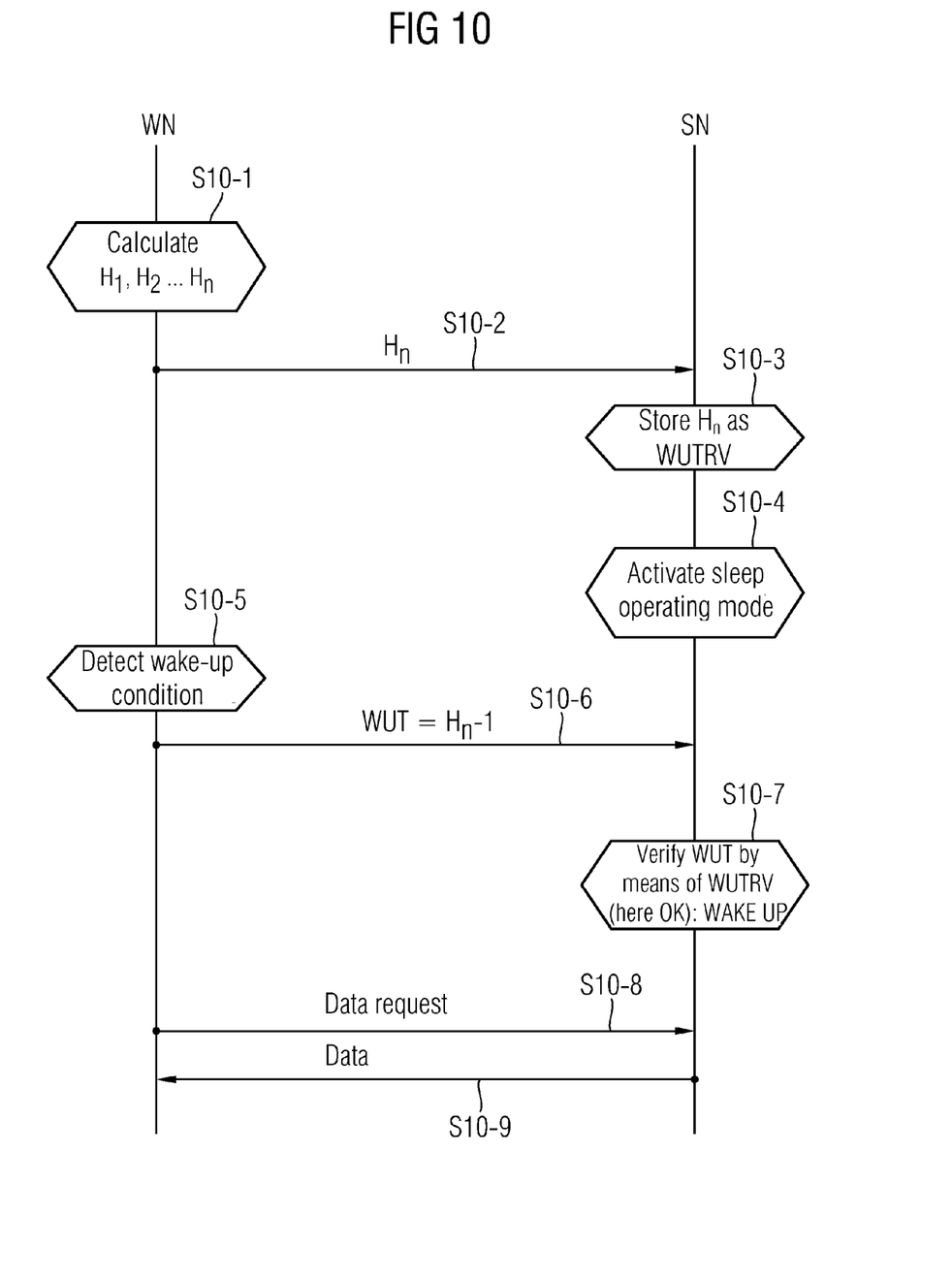
FIG. 10 shows a signal diagram for illustrating a further exemplary embodiment of the method.

FIG. 10 shows a further variant of the method in which the generated wake-up token WUT consists of a calculated hash value of a hash chain. A node WN of the network 1 calculates (S10-1) a plurality of hash values $H_i$ of a hash chain, for example based on an anchor value. A hash value Hn of the hash chain is transmitted as a wake-up token WUT to the destination network node SN (S10-2) and verified by means of an adjacent hash value of the hash chain, namely the hash value $H_{n-1}$ (S10-7). If the verification is successful, the destination network node SN changes from the sleep operating mode to normal operating mode and transmits (S10-9) the requested (S10-8) data to the network node WN.

Figure 11:
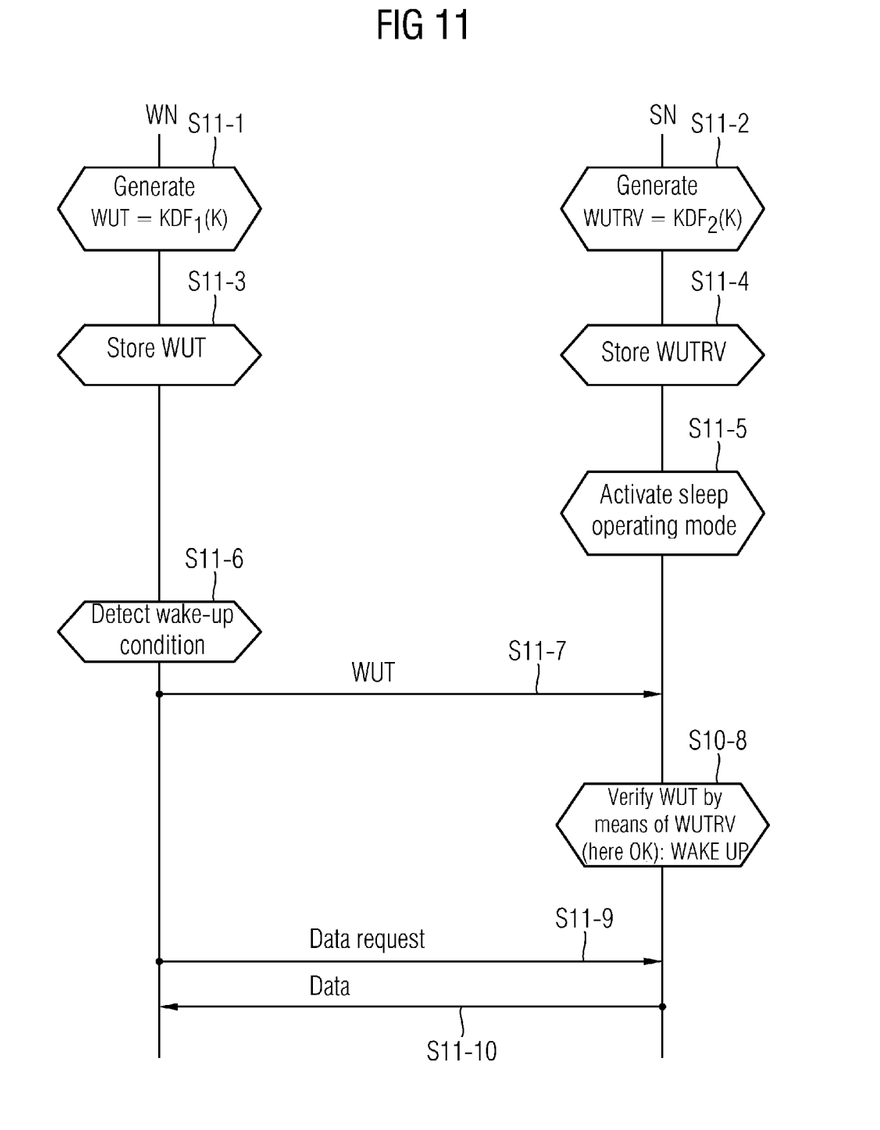
FIG. 11 shows a signal diagram for illustrating a further exemplary embodiment of the method.

FIG. 11 shows a further variant in which the wake-up token WUT and the associated wake-up token WUTRV separated by a network node WN of the network 1 and by the destination network node SN are derived (S11-1, S11-2) and stored (S11-3, S11-4) by a cryptographic key K. The two nodes WN, SN may thus use the same or different key derivation functions KDF. After detection (S11-6) of a wake-up condition by the node WN (S11-6) the destination node SN transferred in step S11-5 into sleep operating mode is activated after verification (S11-8) of the transmitted (S11-7) WUT and provides the requested (S11-9) data (S11-10).

In the method according to various embodiments, by the use of a secret, preferably changing, wake-up token WUT, a sleep deprivation attack is prevented in which an attacker continuously wakes the network node 2 in order to prevent said network node 2 from remaining in an energy-saving sleep mode.

The method according to various embodiments prevents, therefore, the lifetime and/or operating time of the network node 2 from being shortened by sleep deprivation attacks. By sleep deprivation attacks, the operating time of a sensor network node and/or a network node 2 of a wireless network 1 may be reduced from several years to a few hours. The undesirable reduction of the lifetime is prevented by the method according to various embodiments.

What is claimed is:

1. A method for activating a destination network node to be woken up in a wireless network, comprising:
   with the destination network node maintained in a sleep operating mode, a wake-up circuit of the destination network node:
   receiving a secret wake-up token;
   performing a verification of the received secret wake-up token based on a predetermined test function and at least one wake-up token reference value stored by the destination network node; and
   waking up the destination network node from the sleep operating mode in response to a successful verification of the received secret wake-up token based on the predetermined test function and the at least one stored wake-up token reference value;
   wherein the waking of the destination network node comprises an activation of a main radio module for transmitting and receiving messages and wherein the wake-up circuit has a lower energy consumption than the main radio module.

2. The method according to claim 1, the secret wake-up token and the wake-up token reference value being generated by the destination network node itself and, before the destination network node is changed into the sleep operating mode, being transmitted to a different network node of the network and stored there for subsequent activation of the destination network node.

3. The method according to claim 1, the wake-up token and the wake-up token reference value being generated by a different network node of the network, the wake-up token reference value, before the destination network node is changed into the sleep operating mode, being transmitted to the destination network node and being stored there for subsequent activation of the destination network node.

4. The method according to claim 3, the wake-up token and the wake-up token reference value being generated by a central security management node.

5. The method according to claim 4, the generated wake-up token reference value being transmitted from the central security management node to the destination network node and, before the destination network node is changed into the sleep operating mode, being stored in the destination network node.

6. The method according to claim 5, the generated wake-up token being provided by the central security management node to a network node for activating the destination network node.

7. The method according to claim 1, the wake-up token reference value being generated by the destination network node and the wake-up token being generated by a different network node of the wireless network based on a common secret key.

8. The method according to claim 7, the wake-up token reference value and the wake-up token being formed by means of a key derivation function from the key.

9. The method according to claim 8, the key derivation function being a hash function.

10. The method according to claim 1, the wake-up token and the wake-up token reference value being renewed after each activation process of the destination network node or after a predetermined number of activation processes of the destination network node or at predetermined time intervals.

11. The method according to claim 9, the wake-up token and the stored wake-up token reference value being formed by two adjacent members of a hash chain consisting of hash values.

12. The method according to claim 1, the wake-up token and the wake-up token reference value being derived from a character string.

13. The method according to claim 12, the character string of the wake-up token being assembled from one or more character sequences.

14. The method according to claim 13, the assemblable character sequence comprises:
   an identification code for identifying the network node which transmits the wake-up token to the destination network node for the activation thereof,
   a reason code which provides a reason for the activation of the destination network node,
   a conditional wake-up code which provides a condition for the activation of the destination network node,
   a node address of the destination network node or
   a predetermined wake-up code.

15. A network node for a wireless network comprising:
   an integrated wake-up circuit which transfers the network node from a sleep operating mode into a normal working operating mode by:
   with the destination network node maintained in the sleep operating mode, the wake-up circuit:
   receiving a secret wake-up token;
   performing a verification of the received secret wake-up token based on a predetermined test function and at least one wake-up token reference value, stored by the destination network node; and
   waking up the destination network node from the sleep operating mode in response to a successful verification of the received secret wake-up token based on the predetermined test function and the at least one stored wake-up token reference value;
   wherein the transfer of the destination network node into the menial working operating mode comprises an activation of a main radio module for transmitting and receiving messages and the wake-up circuit having a lower energy consumption than the main radio module.

16. The network node according to claim 15, the network node having a memory for storing the wake-up token reference value.

17. The network node according to claim 15, the network node being a sensor network node comprising at least one sensor.

18. The network node according to claim 15, the network node being a portable telecommunication terminal.

19. The network node according to claim 18, the telecommunication terminal being a mobile telephone, a laptop or a PDA.

20. A wireless network comprising a plurality of network nodes according to claim 15.

21. A computer program product including program commands stored on a non-transitory computer readable storage medium of a network node in a wireless network, which when executed on a computer provide for waking up the network node by:
   with the destination network node maintained in a sleep operating mode:
   receiving a secret wake-up token;
   performing a verification of the received secret wake-up token based on a predetermined test function and at least one wake-up token reference value stored by the destination network node; and
   waking up the destination network node from the sleep operating mode in response to a successful verification of the received secret wake-up token based on the predetermined test function and the at least one stored wake-up token reference value;

wherein the waking of the destination network node comprises an activation of a main radio module for transmitting and receiving messages and wherein the wake-up circuit has a lower energy consumption than the main radio module.

\* \* \* \* \*